United States Patent
McFarland

(10) Patent No.: US 8,060,658 B2
(45) Date of Patent: Nov. 15, 2011

(54) AUTO ADDRESSING DEVICES ON A COMMON POWER AND COMMUNICATION BUS STRUCTURE AND METHOD THEREFOR

(75) Inventor: Norman R. McFarland, Palatine, IL (US)

(73) Assignee: Siemens Industry, Inc., Alpharetta, GA (US)

( * ) Notice: Subject to any disclaimer, the term of this patent is extended or adjusted under 35 U.S.C. 154(b) by 189 days.

(21) Appl. No.: 12/398,802

(22) Filed: Mar. 5, 2009

(65) Prior Publication Data

US 2009/0228609 A1  Sep. 10, 2009

Related U.S. Application Data

(60) Provisional application No. 61/034,268, filed on Mar. 6, 2008.

(51) Int. Cl.
*G06F 3/00* (2006.01)
*H02J 13/00* (2006.01)

(52) U.S. Cl. .......................... 710/4; 340/9.16
(58) Field of Classification Search .. 710/4; 340/825.52
See application file for complete search history.

(56) References Cited

U.S. PATENT DOCUMENTS

| | | | | |
|---|---|---|---|---|
| 4,481,579 A * | 11/1984 | Kinghorn | | 710/4 |
| 4,510,493 A * | 4/1985 | Bux et al. | | 370/258 |
| 5,204,669 A * | 4/1993 | Dorfe et al. | | 340/825.52 |
| 5,452,424 A * | 9/1995 | Goeppel | | 713/1 |
| 5,805,817 A * | 9/1998 | Yu et al. | | 709/224 |
| 6,009,479 A * | 12/1999 | Jeffries | | 710/8 |
| 6,049,744 A * | 4/2000 | Kinoshita et al. | | 700/195 |
| 6,185,184 B1 * | 2/2001 | Mattaway et al. | | 370/230 |
| 6,240,478 B1 * | 5/2001 | Brickell | | 710/110 |
| 6,356,974 B2 * | 3/2002 | Chevallier | | 711/103 |
| 6,501,761 B1 * | 12/2002 | Pannell et al. | | 370/403 |
| 6,629,172 B1 * | 9/2003 | Andersson et al. | | 710/104 |
| 6,738,920 B1 * | 5/2004 | Horne | | 713/500 |
| 6,754,721 B2 * | 6/2004 | Heckel | | 710/4 |
| 7,551,492 B2 * | 6/2009 | Kim | | 365/185.29 |
| 2002/0138668 A1 * | 9/2002 | Heckel | | 710/4 |

FOREIGN PATENT DOCUMENTS

| | | |
|---|---|---|
| DE | 19934514 C1 | 2/2001 |
| DE | 102005025703 A1 | 12/2006 |
| DE | 102005062540 A1 | 7/2007 |

OTHER PUBLICATIONS

International Search Report including Notification of Transmittal of the International Search Report, International Search Report and Written Opinion of the International Searching Authority.

* cited by examiner

*Primary Examiner* — Henry Tsai
*Assistant Examiner* — Hyun Nam

(57) ABSTRACT

A method for auto-addressing a device in communication with a controller is disclosed. The method includes communicating a pulse from a first contact of a controller, receiving the pulse at a second contact of a device in communication with the controller, communicating a number of pulses from a first contact of the device, and receiving the number of pulses at a second contact of the controller, wherein the number of pulses indicates a number of devices in communication with the controller.

20 Claims, 10 Drawing Sheets

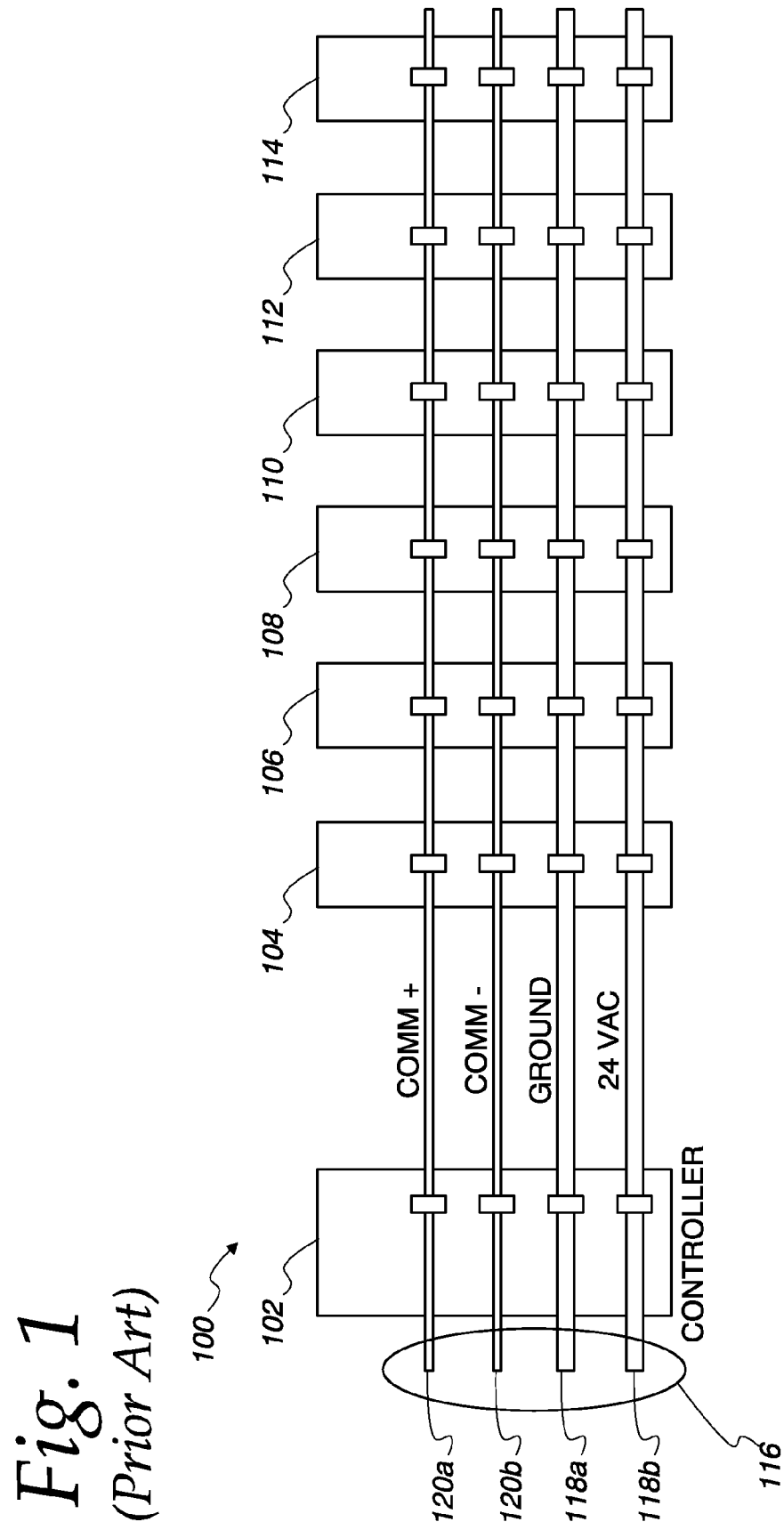

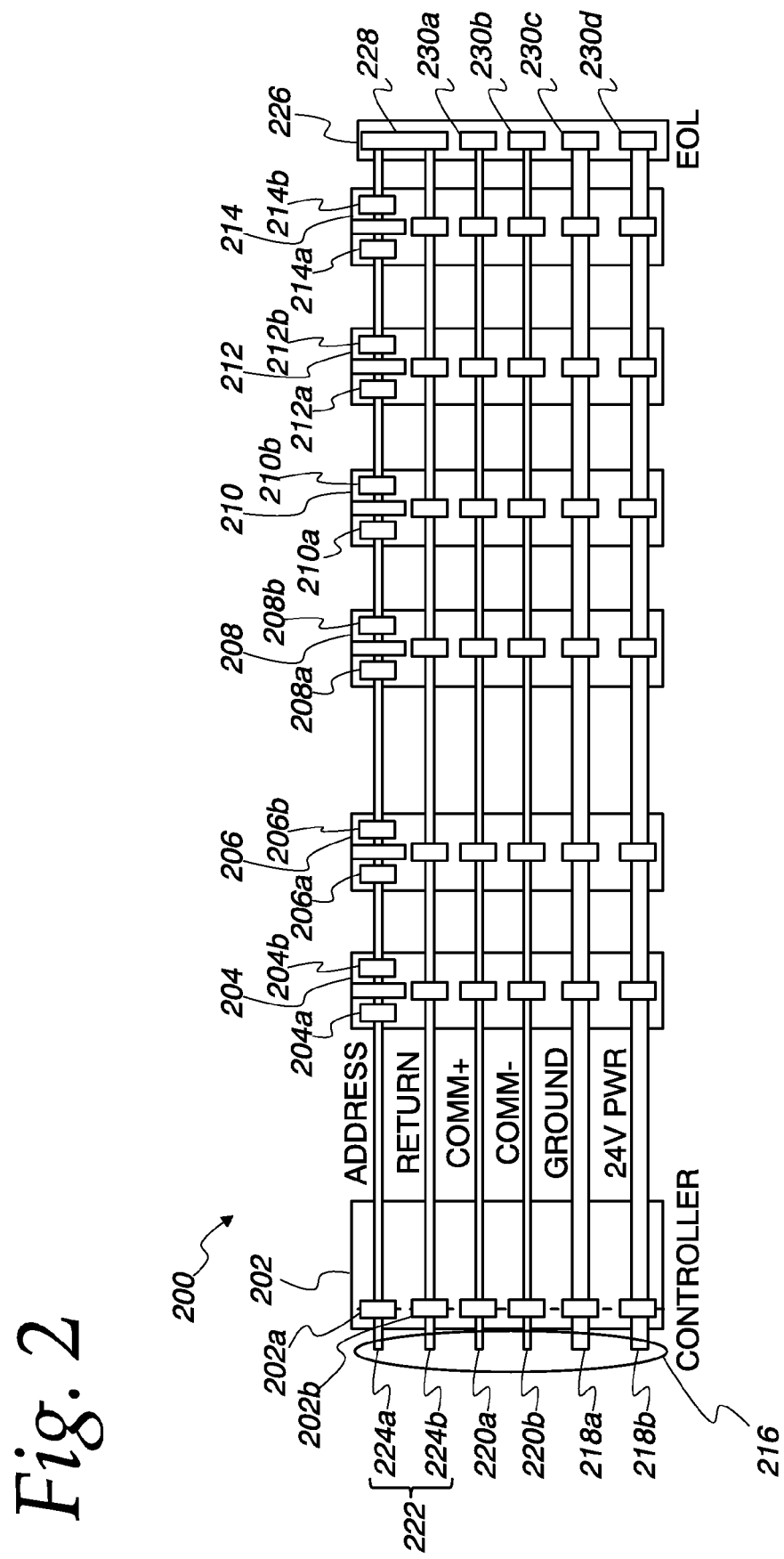

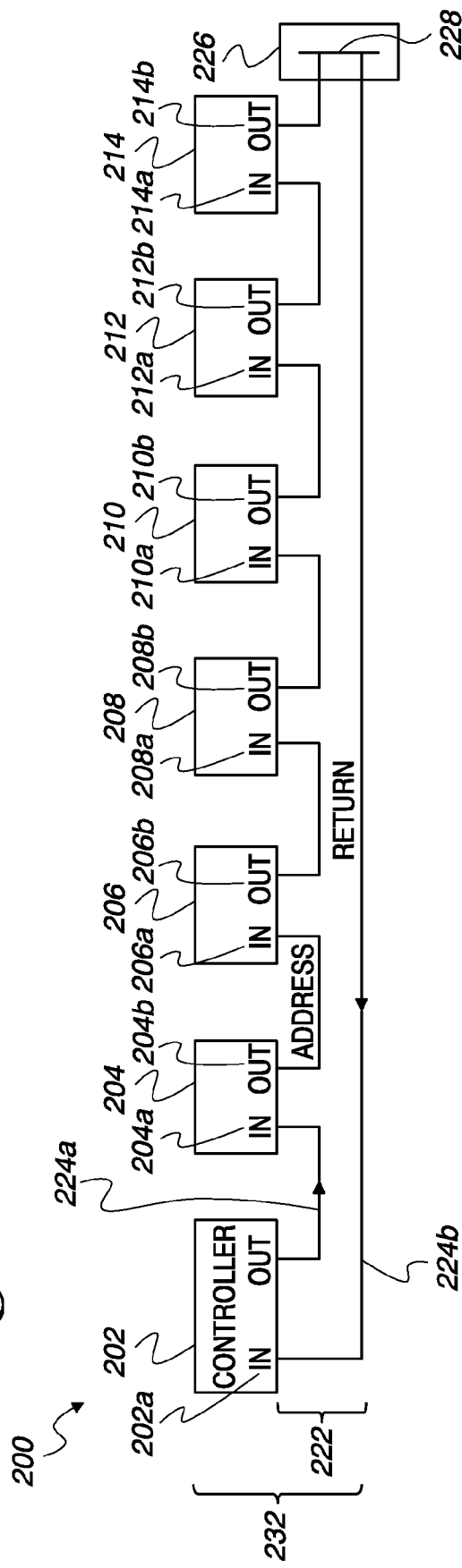

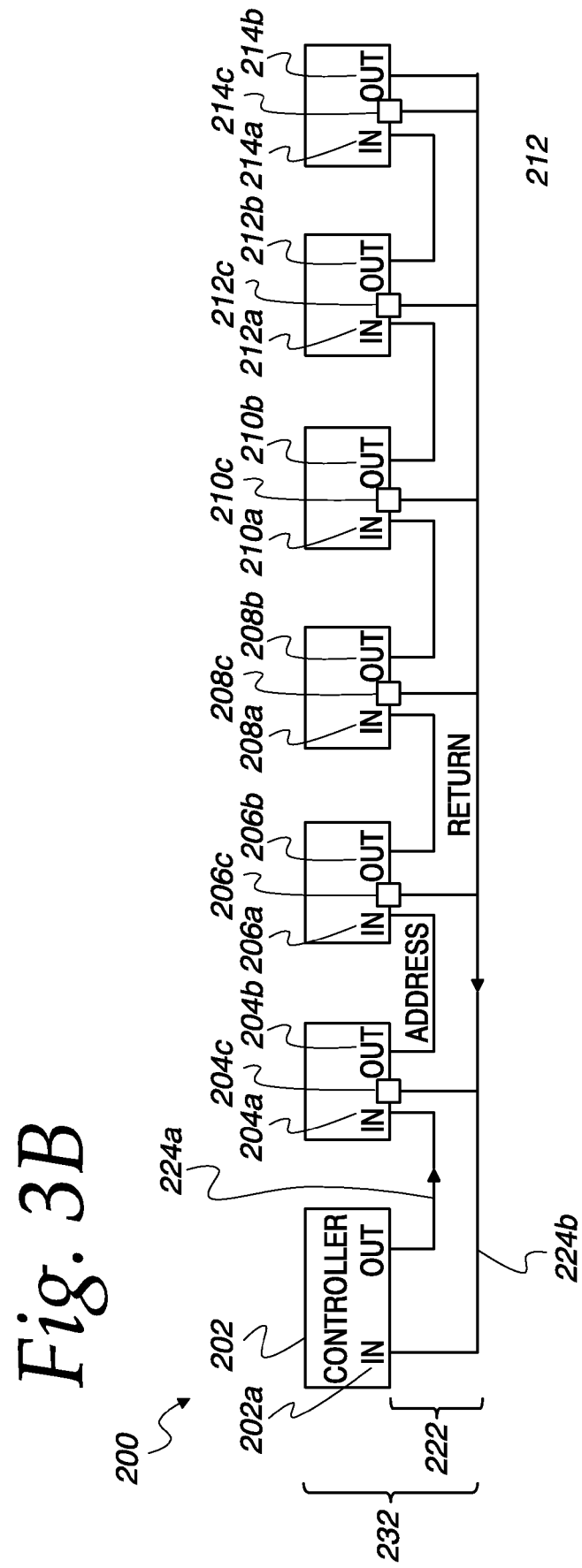

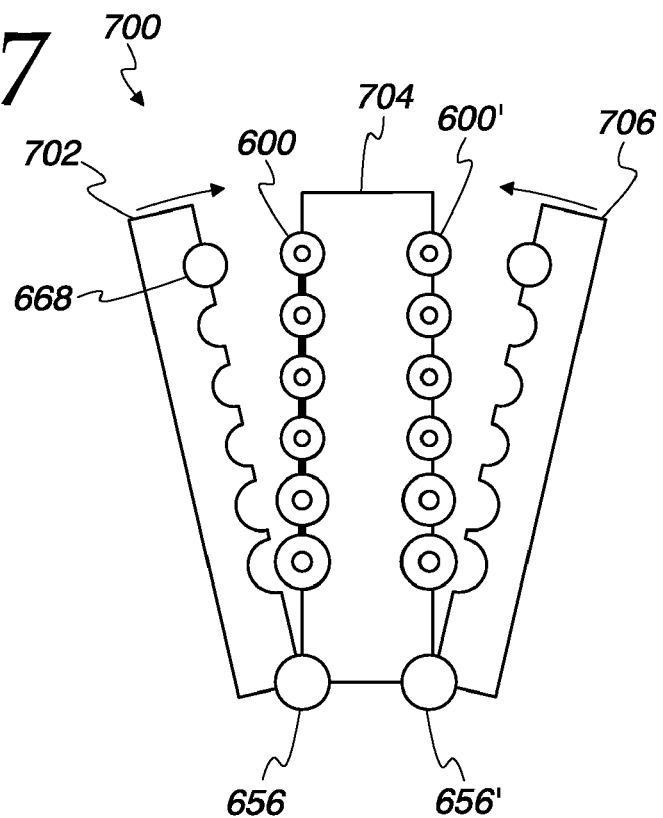
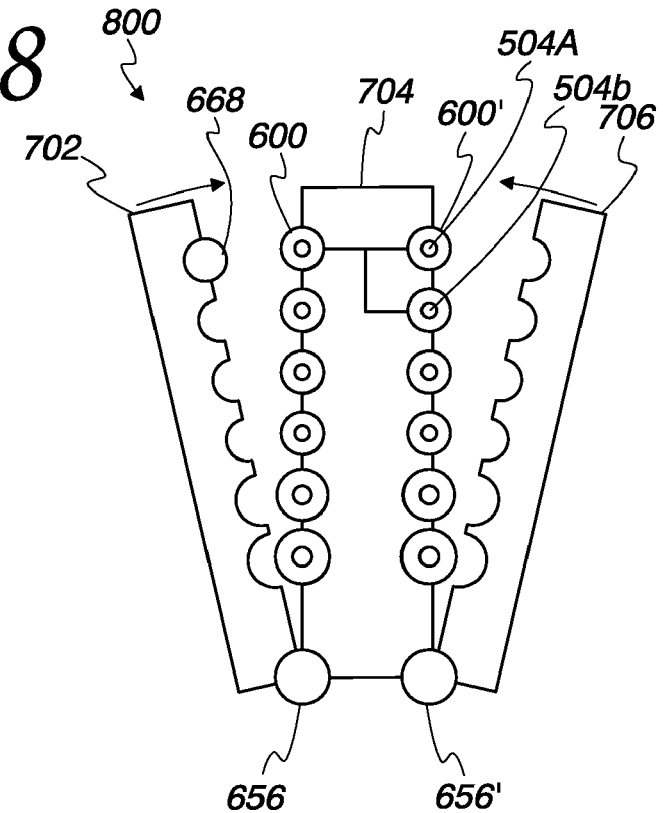

US 8,060,658 B2

AUTO ADDRESSING DEVICES ON A COMMON POWER AND COMMUNICATION BUS STRUCTURE AND METHOD THEREFOR

PRIORITY CLAIM

This patent document claims the priority benefit provided under 35 U.S.C. §119(e) to U.S. provisional patent application Ser. No. 61/034,268, filed on Mar. 6, 2008. The content of this provisional patent application is incorporated herein by reference for all purposes.

BACKGROUND

Installation and configuration of a control and/or monitoring system can be an expensive and time-consuming process. In particular, addressing and identifying each component and/or device for operation in the system often requires that each individual device be manually configured and identified. Ethernet, Zigbee or other network-based systems may address this by utilizing intelligent devices and assigning them a network identification and/or alias. However, these devices and network-based systems are more expensive and complex than may be necessary for a given application.

It would be desirable to provide a system, device and method that could address these areas in a simple and low cost manner.

SUMMARY

In an embodiment, a method for auto-addressing a device in communication with a controller is disclosed. The method includes communicating a pulse from a first contact of a controller, receiving the pulse at a second contact of a device in communication with the controller, communicating a number of pulses from a first contact of the device, and receiving the number of pulses at a second contact of the controller, wherein the number of pulses provides and indication of a number of devices in communication with the controller.

In another embodiment, a method for auto-addressing a device in communication with a controller is disclosed. The method includes communicating a pulse from a first contact of a controller to a second contact of a device in communication with the controller, receiving a number of pulses at a second contact of the controller from a first contact of the device, wherein the number of pulses indicates a number of devices in communication with the controller.

In another embodiment, a controller configured for auto-addressing devices in communication therewith is disclosed. The controller includes a first communication contact, a second communication contact, a communication processor in communication with the first and second communication contacts, wherein the communication processor is configured to communicate a pulse via the first communication contact to a device in communication with the controller, and to receive a number of pulses from the device at a second communication contact, wherein the number of pulses indicates a number of devices in communication with the controller.

Other embodiments are disclosed, and each of the embodiments can be used alone or together in combination. Additional features and advantages of the disclosed embodiments are described in, and will be apparent from, the following Detailed Description and the figures.

BRIEF DESCRIPTION OF THE FIGURES

FIG. 1 illustrates a known communication system configuration;

FIG. 2 illustrates an embodiment of a communication system configured according to the disclosure provided herein;

FIG. 3 illustrates an auto-addressing loop portion of the communication system shown in FIG. 2;

FIG. 3B illustrates an alternate embodiment of the auto-addressing loop portion of the communication system shown in FIG. 2;

FIG. 7 illustrates an extender connector for use in a communication system configured according to the disclosure provided herein; and FIG. 8 illustrates a branching or splitter connector for use in a communication system configured according to the disclosure provided herein.

DETAILED DESCRIPTION

Figure 3A:
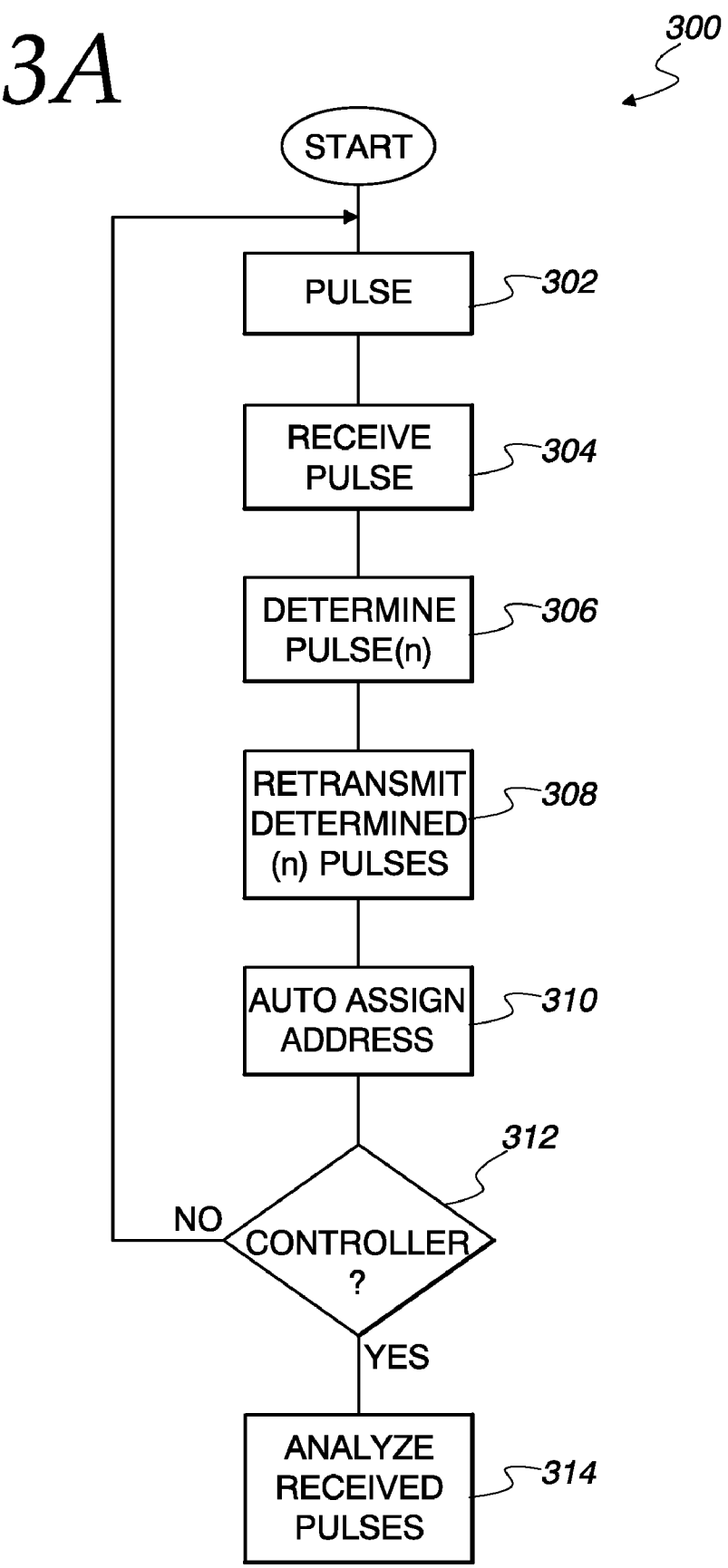
FIG. 3A is a flowchart of the operation of the auto-addressing loop portion of the communication system shown in FIG. 2.

The system, method and devices discussed and disclosed herein relate to the configuration, maintenance and troubleshooting of a network or linked series of devices. The devices may be linked, for example, via a backplane, a ribbon cable, individual wires or any other suitable conduit. A suitable conduit, in one embodiment, is a ribbon cable configured to provide power and two-way communication between a controller and one or more devices. In another embodiment, the controller is configured to communicate a single pulse, signal or indicator to a device connected via one of the conduits discussed above. The device, in turn, receives the pulse from the controller and communicates two pulses in response. This process repeats with each device in communication with the conduit, generating and communicating one more pulse than was received. The last device communicates a number of pulses (n) to the controller. The received n pulses communicates to the controller that there are n−1 devices in communication with the controller. Moreover, the controller can automatically assign a unique numerical identifier 1 . . . n−1 to each of the devices. In another embodiment, the devices may communicate a second pulse along the same communication path as the original pulse was received.

FIG. 1 illustrates an embodiment of a known communication system 100 that includes a controller 102 coupled to device or modules 104 to 114 via a conduit 116. The conduit 116 includes a pair of power lines 118a and 118b and a pair of communication lines 120a and 120b. In alternate embodiments, the conduit 116 could be a backplane, individual wires, a ribbon cable or any other suitable structure. The power lines 118a and 118b could, based on the requirements of the system, be configured to provide, for example, 12 VDC, 120 VAC, 24 VDC or any other required power. Moreover, in alternate embodiments, the conduit 116 may be configured to include multiple power lines and conductors to supply different voltages to different components operating within the system. The required power may be provided by the controller 102 or via an external source depending on the requirements of the system, devices and modules. When configuring the system 100, each of the individual devices or modules 104 to 114 must be manually addressed and identified to allow communication with the controller 102. This configuration and addressing process is a time-consuming, tedious and expensive process.

FIGS. 2 and 3 illustrate an embodiment of an auto-addressing communication system 200 that includes a controller 202 coupled to devices or modules 204 to 214 via a conduit 216. The conduit 216 could be a backplane configured to carry and communicatively couple the devices or modules 204 to 216, individual, manually installed wires, a standard or custom designed ribbon cable or any other suitable structure transmission bus. The conduit 216 includes a pair of power lines 218a and 218b and a pair of communication lines 220a and 220b. The conduit 216 further includes a communication loop 222 having communication legs 224a and 224b. The communication loop 222 may be established in cooperation with an end-of-line (EOL) connector 226. The EOL connector 226 may further include a loop connector 228 arranged to communicatively couple the communication leg 224a to the communication leg 224b. The EOL connector 226 may further include terminators 230a to 230d for each of the power and communication lines 118a, 118b, 120a and 120b, respectively. Each of the devices or modules 204 to 214 includes and first communication contact 204a and second communication contact 204b (first and second contacts for the individual modules 206 to 214 are identified as 206a, 206b through 214a and 214b). The controller 202 similarly includes a first contact 202a and a second contact 202b communicative engaging communication legs 224a and 224b.

FIG. 3 illustrates an auto-addressing loop or portion 232 that includes, in this exemplary embodiment, individual modules 206 to 214 and communication legs 224a and 224b. As illustrated in this exemplary configuration, the communication leg 224a is daisy-changed from the controller 202 to each of the devices and modules 204 to 214 and the communication leg 224b returns or connects back to the controller 202 through the EOL connector 226.

FIG. 3A is a flowchart of an exemplary operation 300 or configuration of the system 200 shown in FIGS. 2 and 3. At block 302, the controller 202 may generate and communicate a pulse from the contact 202a of the controller 202 to the contact 204a of the module 204.

At block 304, the pulse, which may be, for example, a voltage pulled to ground or a constant 12 VDC signal, etc., is received by the module 204.

At block 306, the module 204 determines the number of pulse (n) received at contact 204a. In this exemplary embodiment, module 204 receives one (1) pulse from the controller 202.

At block 308, the module 204, in turn, retransmits the determined number of pulse (n) from the contact 204b to the contact 206a of the module 206. The module 204 further waits or pauses a defined between pulse interval or delay and communicates an additional pulse (1) to the module 206. Thus, the total number of pulses transmitted by each successive device is the number of received pulses (n) incremented or increased by one (n+1).

At block 310, the module 204 having received a single pulse from the controller 202 assumes the automatically assigned address of one (1). In this manner, the module 206 will receive two pulses (the retransmission of the pulse from the controller 202 and the new pulses added by the module 204) and assume the automatically assigned address of two (2). The pulses generated by each device or module and the controller may have a duration or period of, for example, a 100 msec or any other time sufficient to drive an LED or other indicator thereby allowing and installer or operator to visual see the addressing process occur. The time between pulses may similarly be a dwell or waiting period equal to, or of different length than, the 100 msec pulse duration. The contacts on each of the devices and/or controller may be monitored more often, for example, every 10 msec, for receipt of an incoming indication such as a pulse, a level change, a leading edge, a falling edge, or any other indication or notification.

At block 312, the process may restart/repeat from block 302 unless the pulses n+1 are received by the controller 202.

At block 314, the controller 202 analyzes the received pulses n+1 and to determine that it is in communication with n devices and each of the devices is sequentially numbered 1 to n.

Upon completion of communication of the pulses through the communication loop 222, the controller 202 can communication directly with each of the devices or modules 204 to 214 utilizing its unique, auto-assigned address. The unique, auto-assigned address may be the physical address of the module or could be utilized as a temporary address to allow the controller to communicate with the module during a set-up, installation or maintenance environment. Subsequently, the temporary address may be replaced and/or supplemented with a permanent address and/or network identification provided by the controller 202 and/or the operator.

In this embodiment each of the first and second communication contacts is discussed, for the sake of convenience, as exclusively communicating or receiving pulses. However, it will be understood, that the first and second communication contacts on all of the devices or modules and the controller may be configured to both communicate and receive or sense pulses along the communication legs 224a and 224b. This configuration allows for the wires of communication leg 224a to be physically swapped at installation, and enables the devices 204 to 214 to detect or determine the a and b contacts or pins by which actual contact (a or b) receives the pulse.

In one embodiment, each of the modules 204 to 214 is configured to communicate an acknowledgement pulse along the same path and via the same communication contact that the pulse(s) are received. For example, the device or module 206 may communicate an acknowledgement pulse via the first contact 206a after communicating n+1 pulses via the second contact 206b. The controller 202 may, in turn, count and analyze the received number of acknowledgment pulses received on at contact 202a to determine the number of devices or modules in communication along the communication leg 224a and/or determine the last device or module communicating before a break or disruption. The acknowledgement pulse may be utilized to drive or active an LED at the controller 202 thereby providing a visual indicator to a user.

In another embodiment, any of the modules 204 to 214 may be configured to function or operate as an un-addressed module (UAM). For example, if any module 204 to 214 did not receive a pulse within an extended period (e.g., 30 secs after power-up), then the UAM could generate an extended pulse, a pattern of three (3) pulses, etc. on both first and second communication contacts. Any remaining modules that receive a signal from the UAM stores the information for communication to the controller 202. This UAM procedure or routine may be utilized to troubleshoot wiring problems in complex versions of the auto-addressing communication system 200.

FIG. 3B illustrates another embodiment in which each of the modules 204 to 214 includes a third communication contact 204c, 206c, 208c, 210c, 212c and 214c terminated at, or otherwise in communication with, the communication leg 224b. In this configuration, if a UAM signal such as a pulse is received at one of the third communication contacts before the number of pulses (n) are received at the corresponding first communication contact, then the module, realizing that a pulse exists on the return line before it has been addressed, waits until no pulses are received at the first communication contact for a period of time and then communicates a UAM signal to the controller or any other device using all three communication contacts a, b, and c. In yet another embodiment, the module may retransmit or may communicate the UAM signal to the controller via the terminated connection to the communication leg 224c as discussed above.

In yet another embodiment, the individual terminations 204c to 214c may allow the EOL connector 226 to be eliminated from one configuration. In this embodiment, if a module fails to receive an acknowledgement pulse from a subsequent module, the module may retransmit the appropriate n+1 pulse via the terminated communication leg (204c to 214c) to the controller 202. In this way, either the EOL connector 226 can be eliminated or the controller 202 can determine the where along the communication loop 222 a break may have occurred.

Figure 4:
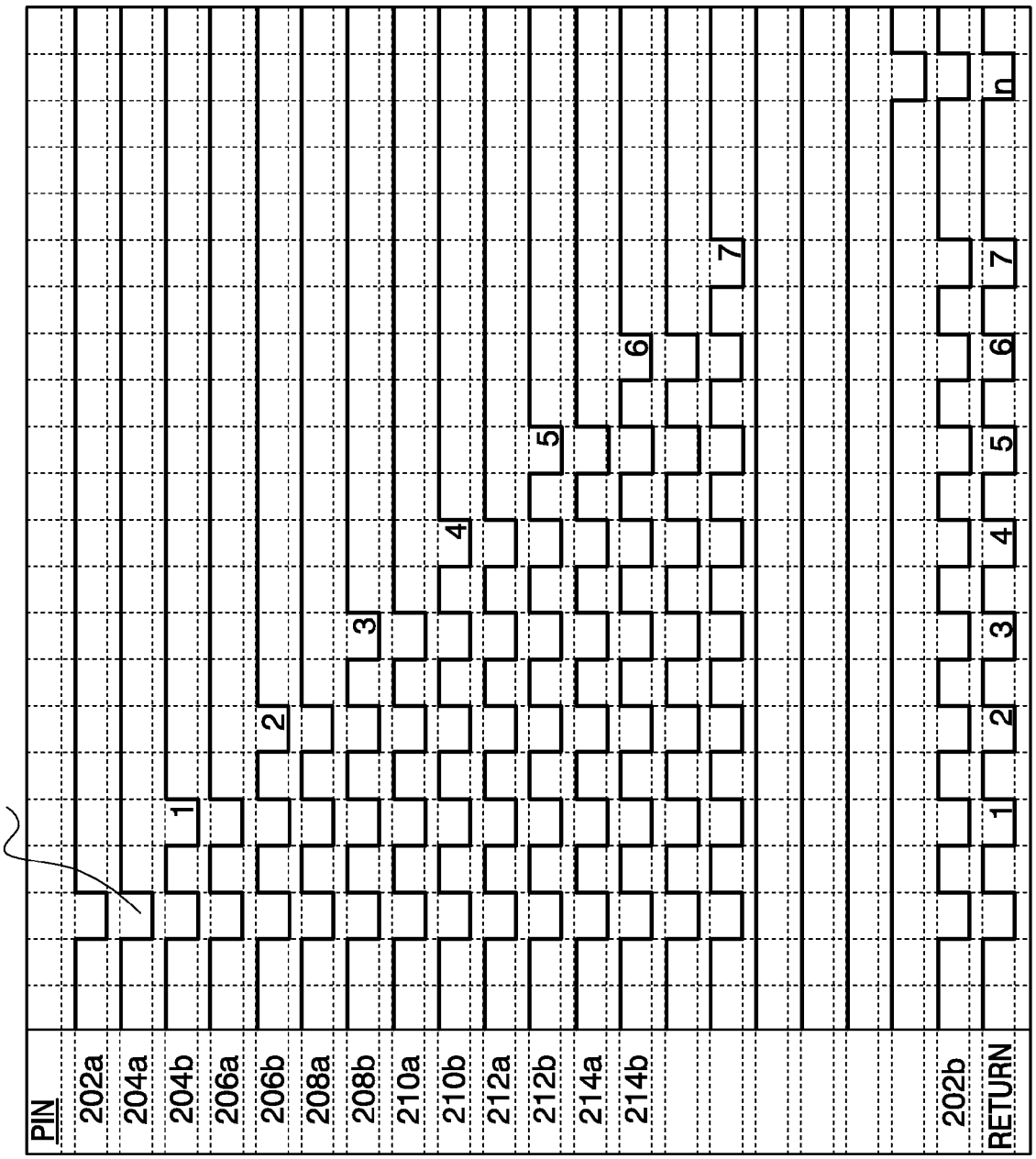
FIG. 4 is a pulse diagram of the operation of an exemplary auto-addressing loop.
Figure 4A:
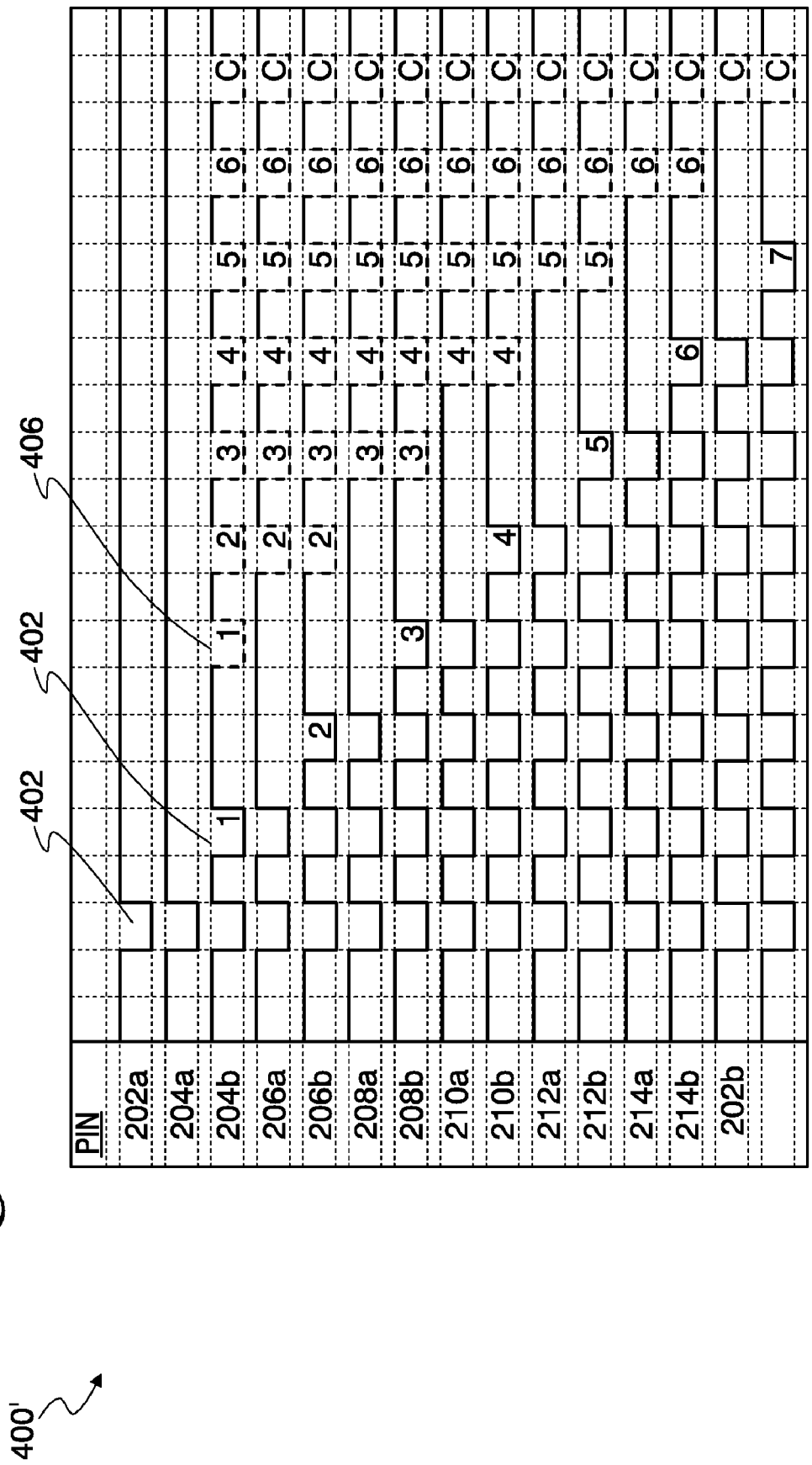
FIG. 4A is an alternate pulse diagram of the operation of an exemplary auto-addressing loop including an acknowledgement pulse.

FIGS. 4 and 4A illustrate graphical representations of the pulses during an auto-addressing procedure, and the pulses and acknowledgement pulses during an auto-addressing procedure. For simplicity, these figures do not show the minute pulse shifts due to sampling at each device. FIG. 4 illustrates a pulse diagram 400 showing a pulse 402 communicated from first contact 202a of the controller 202. Similarly, the pulses 402 and 404 are communicated from the second contact 204b of the module 204. In this example, the inclusion of a single additional pulse (pulse 404) indicates that the module 204 is auto-addressed with the identifier one (01). The process of including and transmitting an additional pulse for each additional module continues until a final series of pulses (n+1) is communicated to the second contact 202b of the controller 202. FIG. 4A illustrates and alternate pulse diagram 400' showing pulses 402 communicated from the first contact 202a and a corresponding acknowledgement pulse 406 subsequently received at the first contact 202a.

A communication system configured in accordance with one or more elements disclosed herein provides for automatically addressing devices, modules and/or elements hardwired thereto. Configuring the first and second contacts of the devices, modules and/or elements to both communicate and receive pulses or signals, the assembly and/or wiring of the system may be facilitated. The inclusion of the communication loop 222 facilitate diagnostics and trouble shooting within the system 200.

Figure 5:
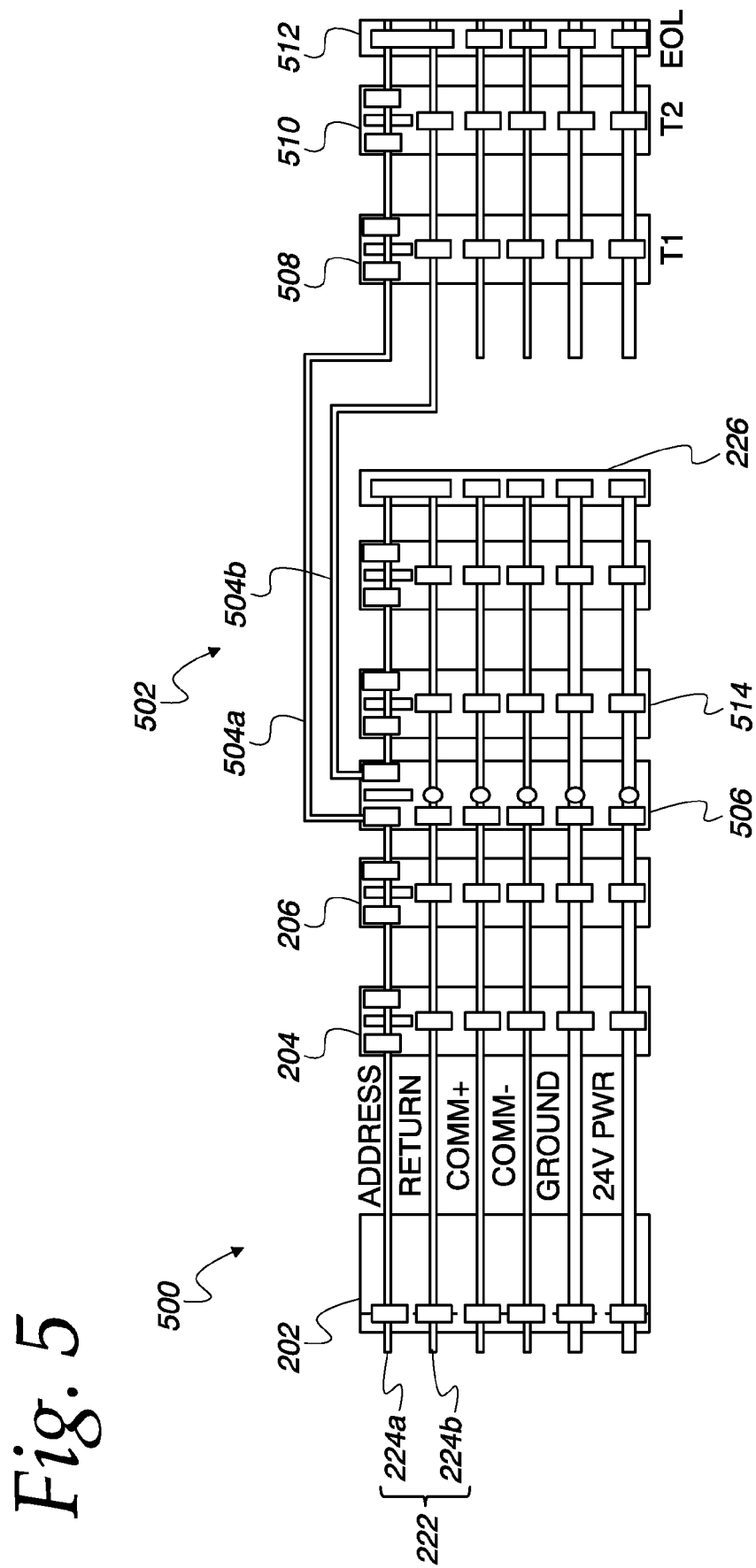
FIG. 5 illustrates another embodiment of a communication system configured according to the disclosure provided herein.

FIG. 5 illustrates another embodiment of an auto-addressing communication system 500 including a T-tap or other branching structure. In this embodiment, a communication branch 502 is established at T-tap or splitter 506 by rerouting communication leg 224a along first communication leg 504a and returning along second communication leg 504b. In this embodiment, the communication branch 502 includes modules 508, 510 and EOL connector 512. Modules 206 and 514 may be configured to monitor and receive any UAM signals generated and communicated by the modules 508 and 510 of the communication branch 502.

Figure 6:
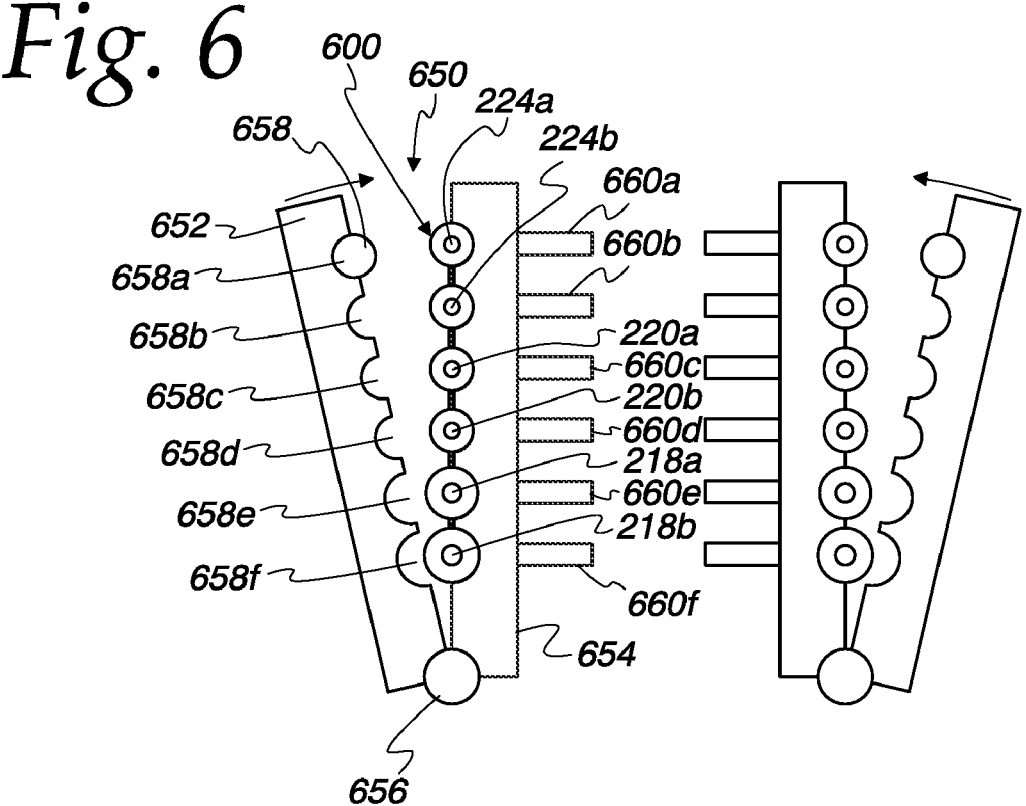
FIGS. 6 and 6A illustrate front and top views of connector for use in a communication system configured according to the disclosure provided herein.
Figure 6A:
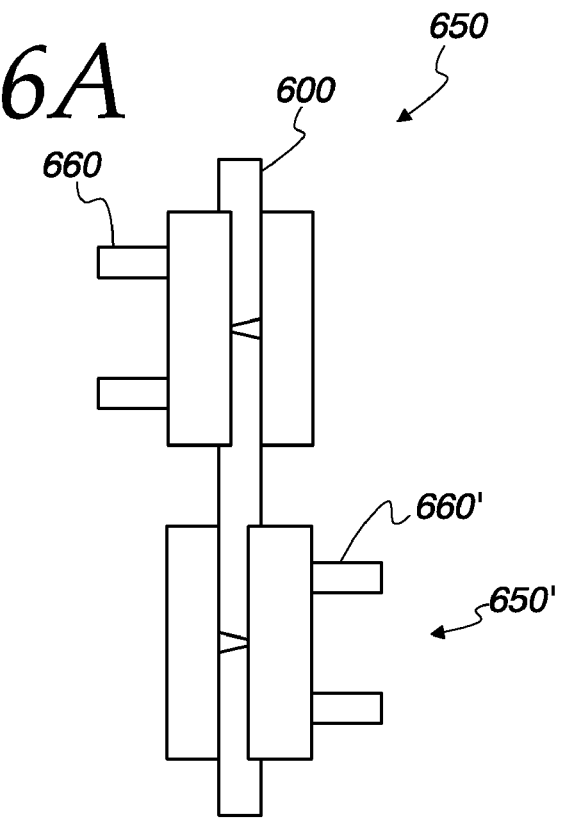

FIGS. 6 and 6A illustrate alternate view of a conduit 600 configured to be mechanically and electrically coupled to a connector 650. In this exemplary embodiment, the conduit 600 is a ribbon cable that includes pair of power lines 218a and 218b having a larger diameter relative to the diameter of the pair of communication lines 220a and 220b and the communication legs 224a and 224b. In this way, the ribbon cable 600 keyed or configured to allow prevent misalignment or assembly. It will be understood that in this configuration and/or figure, the connector 650 can still be placed on either side of the ribbon cable 600.

The connector 650 is a two-piece component including a first portion 652 pivotably attached to a second portion 654 via a hinge 656. The first and second portions 652, 654 may include a plurality of channels or grooves generally indicated by the reference numerals 658a to 658f sized and arranged to engage the corresponding diameters and configuration of the ribbon cable 600. Each of the channels 658a to 658f may include a conductor to pierce the casing or housing of the cable and communicatively couple the individual conductors to a corresponding contact 660a to 660f on the second portion 654. The first channel 658a may include a non-conductive cutter 668 carried in the first portion and arranged to sever the first communication leg 224a when arranged in the first channel 658a of the second portion 654. In this embodiment, the first channel 658a includes a pair of conductors disposed on opposite sides of the non-conductive cutter 668. In this way, communication may be established between ribbon cable 650 the first and second contacts disposed on each module.

FIG. 6A illustrates a pair of connectors 650 and 650' cooperatively engaged along opposing side of the ribbon cable 600. In this configuration, the relative positions of connectors 660 and 660' are reversed. The reversed relative positions make the ability to communicate and receive pulses at each of the first and second contacts desirable to facilitate setup and maintenance.

FIG. 7 illustrates a connector 650 configured to operate as an extender 700. The extender 700 supports a first ribbon cable 600 and a second ribbon cable 600' between a central portion 704. The central portion 704 is pivotably attached to a first portion 702 and a second portion 706 via hinges 656 and 656', respectively. In operation, the extender 700 provides a direct, conductive connection between each communication and/or power line of the first ribbon cable 600 and the second ribbon cable 600'. In this way, an end of the first ribbon cable 600 can be joined to an end of the second ribbon cable 600'.

FIGS. 5 and 8 illustrate an alternate embodiment of the extender 700 configured to operate as a splitter connector 800. In this embodiment, the first portion 702 may include a non-conductive cutter 668 arranged to severe communication leg 224a and establish first and second contacts on either side of the non-conductive cutter 668. In this exemplary embodiment, the first communication leg 504a may be in communication with the first contact and the communication leg 224a on one side of the non-conductive cutter 668. The second communication leg 504b may, via the EOL connector 512 shown in FIG. 5, may be cross connected to the second contact and remaining portion of the communication leg 224a on the opposite side of the non-conductive cutter 668.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

What is claimed is:

1. A method for auto-addressing a device in communication with a controller, the method comprising
communicating a pulse from a first contact of a controller, wherein the first contact of the controller is in communication with a conduit configured to provide power and a communication loop that includes first and second communication legs;

Receiving, via the first communication leg of the conduit, the pulse at a second contact of a device in communication with the controller;

communicating, via the first communication leg of the conduit, a number of pulses from a first contact of the device;

redirecting the pulse from the first communication leg through a loop connection portion of an end-of-line connector to the second communication leg, wherein the first communication leg and the second communication leg cooperate with the loop connection portion to establish the communication loop; and receiving, via the second communication leg, the number of pulses at a second contact of the controller, wherein the number of pulses indicates a number of devices in communication with the controller.

2. The method of claim 1, wherein the number of pulses indicates one more than the number of devices in communication with the controller.

3. The method of claim 1 further comprising:
communicating a second pulse, in response to the received pulse, from the second contact of the device, and
receiving the second pulse at the first contact of the controller, wherein the number of pulses indicates one more than the number of devices in communication with the controller.

4. The method of claim 1, wherein communicating a number of pulses further comprises:
generating multiple pulses corresponding to an address of the device; and
communicating the multiple pulses and the received pulse.

5. The method of claim 1, wherein communicating the pulse includes communicating the pulse via a ribbon cable.

6. A method for auto-addressing a device in communication with a controller, the method comprising
communicating a pulse from a first contact of a controller to a second contact of a device in communication with the controller wherein the pulse is communicated via a conduit, and wherein the conduit is configured to:
provide power from the controller to the device; and
establish a communication loop with the cooperation of a loop connection portion of an end-of-line connector, wherein the loop connection portion connects the first communication leg and the second communication leg;
receiving a number of pulses at a second contact of the controller from a first contact of the device via the communication loop and the end-of-line connector, wherein the number of pulses indicates a number of devices in communication with the controller.

7. The method of claim 6, wherein the number of pulses indicates one more than the number of devices in communication with the controller.

8. The method of claim 6 further comprising:
communicating a second pulse, in response to the received pulse, from the second contact of the device, and
receiving the second pulse at the first contact of the controller, wherein the number of pulses indicates one more than the number of devices in communication with the controller.

9. The method of claim 6, wherein communicating a number of pulses further comprises:
generating a group of multiple pulses corresponding to an address of the device; and
communicating the group of multiple pulses and the received pulse.

10. The method of claim 6, wherein communicating the pulse includes communicating the pulse via a ribbon cable or a backplane.

11. A controller configured for auto-addressing devices in communication therewith, the controller comprising:
a first communication contact;
a second communication contact communicatively coupled to the first communication contact via a communication loop defined between a loop connection portion of an end-of-line connector and a conduit configured to provide power from the controller, wherein the conduit includes a first communication leg coupled to the first communication contact in communication with, via the loop connection portion, a second communication leg coupled to the second communication contact;
a communication processor in communication with the first and second communication contacts, wherein the communication processor is configured to:
communicate a pulse via the first communication contact to a device in communication with the controller; and
receive a number of pulses from the device at a second communication contact, wherein the number of pulses indicates a number of devices in communication with the controller.

12. The controller of claim 11 further comprising:
a memory in communication with the communication processor, the memory configured to store the received number of pulses.

13. The controller of claim 11, wherein the number of pulses indicates one more than the number of devices in communication with the controller.

14. The controller of claim 11, wherein the communication processor is further configured to:
receive from the device a second pulse at the first communication contact of the controller, wherein the number of pulses indicates one more than the number of devices in communication with the controller.

15. The controller of claim 11, wherein the communication processor is further configured to:
receive multiple pulses corresponding to an address of the device, wherein the multiple pulses includes the pulse communicated by the communication processor.

16. The controller of claim 11, wherein the first and second communication contacts are coupled to a sensor bus.

17. The controller of claim 16, wherein the sensor bus is a ribbon cable.

18. The controller of claim 17, wherein the ribbon cable is includes a power bus and a communication bus.

19. The controller of claim 11, wherein the device is a line-powered device.

20. The controller of claim 19, wherein the line-powered device is a building automation sensor.

* * * * *